United States Patent
Bai et al.

(10) Patent No.: US 7,314,680 B2
(45) Date of Patent: Jan. 1, 2008

(54) INTEGRATED FUEL CELL POWER MODULE

(75) Inventors: Dingrong Bai, Dorval (CA); Jean-Guy Chouinard, Ville St-Laurent (CA); David Elkaim, Ville St-Laurent (CA)

(73) Assignee: Hyteon Inc, Laval, Quebec (CA)

( * ) Notice: Subject to any disclaimer, the term of this patent is extended or adjusted under 35 U.S.C. 154(b) by 407 days.

(21) Appl. No.: 10/948,794

(22) Filed: Sep. 24, 2004

(65) Prior Publication Data
US 2006/0068250 A1    Mar. 30, 2006

(51) Int. Cl.
*H01M 2/08* (2006.01)
*H01M 8/04* (2006.01)
(52) U.S. Cl. ............................. 429/37; 429/26
(58) Field of Classification Search .................. 429/26, 429/37
See application file for complete search history.

(56) References Cited

U.S. PATENT DOCUMENTS

| | | | |
|---|---|---|---|
| 3,881,956 A | 5/1975 | Williams | |
| 4,310,605 A | 1/1982 | Early et al. | |
| 4,732,822 A | 3/1988 | Wright et al. | |
| 4,769,297 A | 9/1988 | Reiser et al. | |
| 4,826,742 A | 5/1989 | Reiser | |
| 4,933,242 A | 6/1990 | Koga et al. | |
| 4,988,583 A | 1/1991 | Watkins et al. | |
| 5,108,849 A | 4/1992 | Watkins et al. | |
| 5,300,370 A | 4/1994 | Washington et al. | |
| 5,382,478 A | 1/1995 | Chow et al. | |
| 5,478,662 A | 12/1995 | Strasser | |
| 5,521,018 A | 5/1996 | Wilkinson et al. | |
| 5,527,363 A | 6/1996 | Wilkinson et al. | |
| 5,547,777 A | 8/1996 | Richards | |
| 5,686,199 A | 11/1997 | Cavalca et al. | |
| 5,840,438 A | 11/1998 | Johnson et al. | |
| 5,863,671 A * | 1/1999 | Spear et al. | 429/12 |
| RE36,148 E | 3/1999 | Strasser | |
| 5,945,232 A | 8/1999 | Ernst et al. | |
| 6,017,648 A | 1/2000 | Jones | |
| 6,037,072 A | 3/2000 | Wilson et al. | |
| 6,048,633 A | 4/2000 | Fuji et al. | |

(Continued)

FOREIGN PATENT DOCUMENTS

CA    2146325    5/1994

(Continued)

OTHER PUBLICATIONS

U.S. Appl. No. 10/861,416, Jun. 7, 2004, Bai et al.

(Continued)

*Primary Examiner*—Patrick Joseph Ryan
*Assistant Examiner*—Thomas H. Parsons
(74) *Attorney, Agent, or Firm*—Ogilvy Renault LLP

(57) ABSTRACT

A fuel cell power system has at least one fuel cell stack assembly having a clamp mechanism for holding plates of the fuel cell stack together, a fuel supply and exhausting stream, an oxidant supply and exhausting stream, and at least one of a fuel cell stack cooling loop and a cogeneration heat exchanger. The cooling loop or the cogeneration heat exchanger has a stack of heat exchange plates held together with the plates of said fuel cell stack by the clamp mechanism.

7 Claims, 15 Drawing Sheets

U.S. PATENT DOCUMENTS

| | | |
|---|---|---|
| 6,066,409 A | 5/2000 | Ronne et al. |
| 6,099,984 A | 8/2000 | Rock |
| 6,124,051 A | 9/2000 | Johnson |
| 6,150,049 A | 11/2000 | Nelson |
| 6,180,273 B1 | 1/2001 | Okamoto et al. |
| 6,207,310 B1 | 3/2001 | Wilson et al. |
| 6,309,773 B1 | 10/2001 | Rock |
| 6,403,249 B1 | 6/2002 | Reid |
| 6,416,895 B1 | 7/2002 | Voss et al. |
| 6,500,579 B1 | 12/2002 | Maeda et al. |
| 6,528,196 B1 | 3/2003 | Fuji et al. |
| 6,602,625 B1 | 8/2003 | Chen et al. |
| 6,605,378 B2 | 8/2003 | Saito et al. |
| 6,627,339 B2 | 9/2003 | Haltiner, Jr. |
| 6,649,293 B1 | 11/2003 | Jones |
| 6,684,948 B1 | 2/2004 | Savage |
| 6,686,080 B2 | 2/2004 | Farkash et al. |
| 6,686,082 B2 | 2/2004 | Leger et al. |
| 6,689,500 B2 | 2/2004 | Nelson |
| 6,692,859 B2 | 2/2004 | Mukerjee |
| 2001/0001052 A1 | 5/2001 | Bonk et al. |
| 2001/0021470 A1 | 9/2001 | May et al. |
| 2001/0049040 A1 | 12/2001 | Grune et al. |
| 2001/0049046 A1 | 12/2001 | Butler |
| 2002/0009648 A1 | 1/2002 | Buchner et al. |
| 2002/0045075 A1 | 4/2002 | Pinto et al. |
| 2002/0045076 A1 | 4/2002 | Pinto et al. |
| 2002/0081474 A1 | 6/2002 | Foster |
| 2002/0106548 A1 | 8/2002 | Chung et al. |
| 2002/0110723 A1 | 8/2002 | Farkash |
| 2002/0168560 A1 | 11/2002 | Mukerjee |
| 2002/0187374 A1 | 12/2002 | Yamauchi et al. |
| 2002/0192531 A1 | 12/2002 | Zimmerman et al. |
| 2003/0003345 A1 | 1/2003 | Ohara et al. |
| 2003/0039875 A1 | 2/2003 | Knights et al. |
| 2003/0039876 A1 | 2/2003 | Knights et al. |
| 2003/0059662 A1 | 3/2003 | Debe et al. |
| 2003/0072986 A1 | 4/2003 | Kusakabe et al. |
| 2003/0072988 A1 | 4/2003 | Kusakabe et al. |
| 2003/0099873 A1 | 5/2003 | Brambilla et al. |
| 2003/0104265 A1 | 6/2003 | Yoshimoto et al. |
| 2003/0118878 A1 | 6/2003 | de Tezanos Pinto |
| 2003/0138688 A1 | 7/2003 | Hattori et al. |
| 2003/0148157 A1 | 8/2003 | Grasso et al. |
| 2003/0152819 A1 | 8/2003 | Hafoh et al. |
| 2003/0170526 A1 | 9/2003 | Hodgson et al. |
| 2003/0180603 A1 | 9/2003 | Richards |
| 2003/0186106 A1 | 10/2003 | Frank et al. |
| 2003/0198839 A1 | 10/2003 | Bruck et al. |
| 2003/0211376 A1 | 11/2003 | Hatoh et al. |
| 2003/0219635 A1 | 11/2003 | Lee et al. |
| 2003/0219643 A1 | 11/2003 | Jefferson et al. |
| 2004/0016412 A1 | 1/2004 | Orsbon et al. |
| 2004/0018412 A1 | 1/2004 | Orbson et al. |
| 2004/0023100 A1 | 2/2004 | Boff et al. |

FOREIGN PATENT DOCUMENTS

| | | |
|---|---|---|
| EP | 0823743 A2 | 2/1998 |
| EP | 0967 675 | 12/1999 |
| EP | 1098381 A1 | 5/2001 |
| EP | 1286408 | 2/2003 |
| EP | 1286408 | 12/2004 |
| JP | 61243662 A2 | 10/1986 |
| JP | 6267564 | 9/1994 |
| JP | 7-22048 | 1/1995 |
| JP | 07022048 | 1/1995 |
| WO | WO 01/48843 A2 | 7/2001 |
| WO | WO 02/069426 A2 | 9/2002 |
| WO | WO 02/093668 A1 | 11/2002 |
| WO | WO 02/093672 A2 | 11/2002 |
| WO | WO 03/026049 | 3/2003 |
| WO | WO 03/026049 A3 | 3/2003 |

OTHER PUBLICATIONS

U.S. Appl. No. 10/861,409, Jun. 7, 2004, Bai et al.

Hirata et al. Journal of Power Sources vol. 83, pp. 41-49 1999.

Wang et al. Journal of Power Sources vol. 94, pp. 40-50 2001.

Neshai et al. http:www.utc.scsu.edu/effects.htm last visited Aug. 5, 2003.

Lie et al. Journal of Power Sources, vol. 115, pp. 90-100 2003.

Yong et al. Journal of Power Sources vol. 118, pp. 193-199 2003.

* cited by examiner

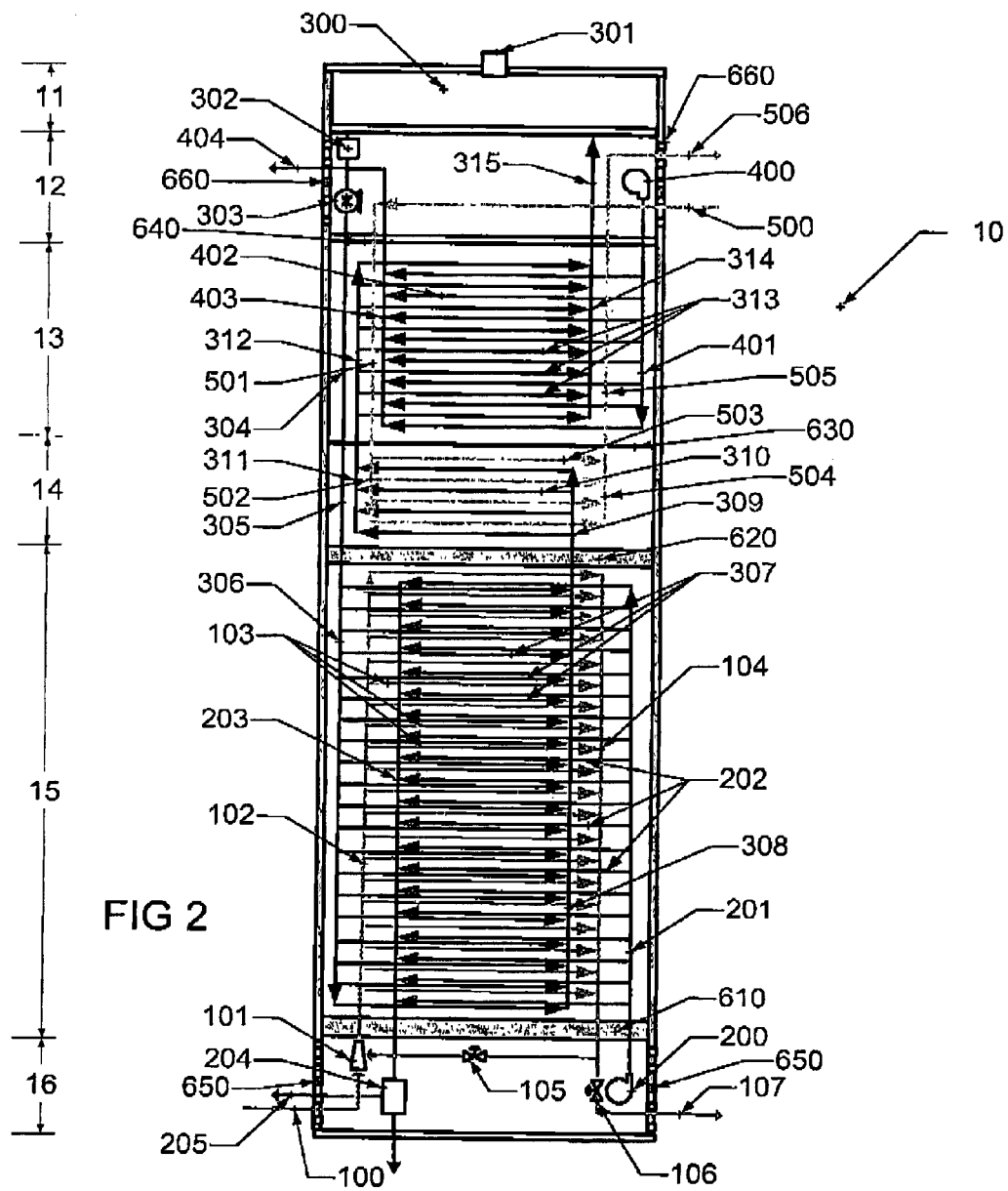

INTEGRATED FUEL CELL POWER MODULE

CROSS-REFERENCE TO RELATED APPLICATIONS

The present application is related to commonly assigned pending U.S. patent application titled "Flow Field Plate for Use in Fuel Cells", filed on Jun. 7, 2004 and bearing Ser. No. 10/861,409, the content of which is hereby incorporated by reference. The application is also related to commonly assigned pending U.S. patent application titled "Fuel Cell Stack with Even Distributing Gas Manifolds", filed on Jun. 7, 2004 and bearing Ser. No. 10/861,416, the content of which is hereby incorporated by reference. The application is also related to commonly assigned pending U.S. patent application titled "Fuel Cell with In-Cell Humidification", bearing agent, the content of which is hereby incorporated by reference.

TECHNICAL FIELD

The present invention relates to devices which produce an electrical current by means of a chemical reaction or change in physical state, and more specifically, packaging and housings for such devices.

BACKGROUND OF THE INVENTION

Fuel cells, in which hydrogen and oxygen combine in an electrochemical reaction to generate electricity with by-product water, have emerged as an alternative to the conventional power generation methods such as internal combustion engines and the like with such obvious advantages as cleanliness, quietness, and efficiency. Fuel cells can find applications in many fields including portable power, transportation and stationary power plants. In general, a fuel cell is an electrochemical device that directly converts the chemical energy of a fuel/oxidizer mixture into electricity. The direct conversion of fuel into electricity means that fuel cells operate at higher efficiencies (~50-65% based on the LHV of fuel) than conventional power generation systems that convert fuel into heat that produces mechanical work for electricity production. Conventional power generation systems are Carnot limited and lose efficiency because of thermodynamic and mechanical limitations in the system. Aside from efficiency considerations, fuel cells offer several other advantages over conventional power systems. In today's climate of increasing environmental awareness, fuel cell systems have the potential to substantially reduce air pollution associated with electricity production. For most types of fuel cells, the only by-product of electricity production is water if hydrogen is used as fuel. The higher system efficiencies for fuel cells translate into enhanced fuel utilization and therefore reduced $CO_2$ emissions compared to lower efficiency systems. Fuel cell power plants will be capable of exceeding stringent present and future environmental regulations for particulates, $NO_x$, and $SO_x$ emissions. In addition, the absence of moving parts in fuel cell mechanical systems greatly reduces the noise associated with conventional power plants, and fuel cell power plants have high reliability with low maintenance. Owing to its advantageous characteristics, amongst other things, fuel cells are particularly applicable in those areas requiring highly reliable, stand-alone power supplies such as is required in telecom and emergency stations.

Among low temperature fuel cells, the proton exchange membrane fuel cells (PEMFCS) have received considerable attention largely due to its nature of low temperature that leads to quick startup as being viewed important for electric vehicles. Since the electrolyte is a polymeric material, there is no free corrosive liquid inside the cell (water is the only liquid), hence material corrosion is kept to a minimum. In addition, PEMFCs are simple to fabricate and have demonstrated a long life.

A single fuel cell consists of an anode and a cathode separated by an electrically insulating electrolyte, which in the case of PEM fuel cells is the proton exchange membrane. To promote the desired electrochemical reactions, the catalyst layer is formed on the surface of the PEM to form a porous electrode membrane assembly (MEA). A hydrogen rich fuel (or pure hydrogen) permeates the porous electrode material of the anode and reacts with the catalyst layer to form hydrogen ions and electrons ($H_2 \rightarrow 2H^+ + 2e^-$). The hydrogen ions migrate through the PEM to the cathode electrode, where the oxygen-containing gas supply (usually air) also permeates through the porous material and reacts with the hydrogen ions and electrons (which arrive from the anode through external circuitry) to produce water and heat ($\frac{1}{2}O_2 + 2H^+ + 2e^- \rightarrow H_2O + Heat$). A practical individual fuel cell generally consists of an electrically conductive anode plate with certain types of flow channels, an MEA and gas diffusion layer (GDL) (or the two integrated), and an electrically conductive cathode plate with certain types of flow channels as well as sealing materials between MEA and the plates. A single cell generally provides about 0.6-0.8 volts at a current density on the order of a few hundred $mA/cm^2$, therefore, a number of fuel cells need to be stacked together to achieve desired electrical power output. The stacked multiple fuel cells are packed between two endplates typically with the attachment means such as tie rods.

A fuel cell power system, as schematically shown in FIG. 1, is centered with a fuel cell stack having two endplates (21,22) on which are positioned fluid connectors for receiving and exhausting fuel, oxidant and coolant. Hydrogen or hydrogen rich fuel (100) from a fuel processor is supplied to the fuel cell stack fuel inlet, with a check valve (101) usually installed on the supply line to prevent any possible backflow from the stack. The depleted fuel from the stack can be either recycled back to the inlet by an appropriate means such as an injector (103) or be sent back to an auxiliary burner to produce heat or to a burner incorporated with the fuel processor to supply heat for fuel reforming. A valve (102) may be installed at the fuel exhaust line to maintain the stack at an appropriate pressure or control the fuel flow. Air is generally fed to the stack after filtration (209), compressed (200) and humidified (202). A practical and convenient air humidification method is the use of a humidifier (such as an enthalpy wheel or a fiber membrane) that exchanges humidity between saturated or even liquid water containing cathode exhausting air and relatively dry and cool incoming air (201). Depleted air, after giving moisture to the incoming air, is preferably passed through a condenser or water separator, or simply a drain valve (206) prior to the vent. To remove the heat released from the fuel cell reactions in order to keep the stack at a preferable operating temperature, a cooling loop is designed, which generally includes a coolant pump (310), a coolant filter (301), a heat recover heat exchanger (sometimes called cogeneration heat exchanger) (304), a backup heat exchanger (sometimes called radiator) (306) that is used to dissipate the heat to the environment only when there is no sufficient cogeneration, and a coolant storage tank (308). The two heat exchangers (304) and (306) can be reduced to one if the fuel cell system is designed to be without cogeneration.

Conventional fuel cell systems are constructed with these multiple components being individually installed and connected together through pipelines and fittings. They are then housed in a package chamber. Such a package, for example, has been shown in FIG. 4 of U.S. Patent Application Publication 2003/0138688 A1, published on Jul. 24, 2003. It is commonly understood in the field that in order to reduce the system size and volume, all these functional components are tightly packaged inside the housing chamber, therefore resulting in increased complexity of the mechanical layout and difficulty in insulating individual components and pipelines and providing maintenance service due to limited accessibility as a result of space tightness.

There are recent efforts in the field to improve the system compactness by integration of multiple components. U.S. Patent Application Publication 2003/0148157 A1 and U.S. Pat. No. 6,605,378 B2, published Aug. 7, 2003 and Aug. 12, 2003, respectively, disclose an integrated assembly including an enthalpy recovery device for transferring moisture and heat from fuel cell cathode exhaust and burner exhaust to incoming cathode air, a water reservoir and a degasifier. All of these are functionally integrated and housed in a chamber. The housing chamber does not include heat exchangers for cogeneration, air compressor/blower for supplying air to cathode, and other accessories as commonly involved in fuel cell power systems as described in FIG. 1.

There is a need for an integration of multiple components of fuel cell systems including fuel cell stacks and associated heat exchangers and other accessories such that weight, volume, and complexity are reduced.

SUMMARY OF THE INVENTION

In order to allow a fuel cell power plant to operate efficiently, reliably and cost-effectively with the minimized weight, volume and complexity, the present invention seeks to provide a fuel cell power module in which a multitude of separate components are mechanically and functionally integrated.

The primary objective of the present invention is to provide a mechanically and functionally integrated compact fuel cell power module. The invention simplifies the fuel cell system assembly, improves thermal integration and increases efficiency, as well as reduces the system size and occupying space. It allows substantially elimination of piping connecting multiple components and their individual insulation.

This invention relates in general to a mechanical and functional integration of multiple components for a proton exchange membrane (PEM) fuel cell assembly provided with a fuel stream, an oxidant stream and a coolant stream. The fuel cell assembly can mechanically and functionally integrate a fuel cell stack, a heat recovery heat exchanger, a back-up air-cooled heat exchanger, a coolant circulation pump, a coolant storage and baffle tank, coolant filter, a cathode air compressor or blower, a air blower for the air-cooled heat exchanger, and other accessorial components necessary to form a compact and substantially pipe-less fuel cell power generation module. The functionally integrated multiple components are further mechanically integrated by a clamping method and housed in an integral housing chamber with its internal surface embedded with necessary thermal insulation material, thus providing a single, compact, and well-insulated power fuel cell assembly.

A functionally and mechanically integrated fuel cell power system according to the present invention is advantageously provided with a number of beneficial engineering and operating attributes, including but not limited to the following.

Compactness: The compactness is apparent from the fact that the involved multiple components of the fuel cell power system are mechanically and functionally integrated into a single package.

Simplicity: Due to the unique mechanic integration of the multiple components of the fuel cell power system, the pipelines and fittings as encountered in the conventional systems are substantially removed. A single package also provides the great simplicity compared to the conventional systems in which multiple components are positioned and connected by various pipelines and fittings in a bulky housing chamber.

Lightweight: Due to removal of pipelines and fittings the system weight can be reduced.

Reduced volume: This is the direct result of system integration according to the present invention. No space is needed to position the pipelines and fittings. In addition, the functionally integrated heat exchangers would result in savings in volumes.

Ease of manufacturing and installation: The manufacturing and assembly of the fuel cell power system according to the present invention becomes much easier compared to the conventional systems. The fuel cell power system is accomplished when the designed plates are stacked and clamped, just like assembly of conventional fuel cell stacks. No extra work is needed to install such components as humidifier, cogeneration heat exchanger and air cooled heat exchanger, and there is no need to install pipelines and fittings to connect these components.

Ease of insulation: Unlike the conventional fuel cell power systems in which all components and pipelines and fittings that need to retain thermal energy must be insulated individually, which commonly represents a tough job due to limited space accessibility. The fuel cell power system according to the present invention only needs to insulate the housing chamber, which can be done easily without limitation of space accessibility.

Cost effective: The capital and labor cost savings can be expected due to removal of pipelines and fittings and increased efficiency.

Increased reliability: The reliability of the fuel cell power system can be increased due to removal of leakage possibilities from pipeline and fittings, increased functional integration of the components and promoted thermal management and humidification.

Higher efficiency: The increased thermal integration and reduced heat loses, and the increase cell performance due to increased water management and mass/heat transfer can be expected according to the present invention.

In accordance with a first broad aspect of the present invention, there is provided a fuel cell power system including at least one fuel cell stack assembly having a clamp mechanism for holding plates of the fuel cell stack together, a fuel supply and exhausting stream, an oxidant supply and exhausting stream, and at least one of a fuel cell stack cooling loop and a cogeneration heat exchanger, in which at least one of the cooling loop and the cogeneration heat exchanger comprises a stack of heat exchange plates held together with the plates of the fuel cell stack by the clamp mechanism.

BRIEF DESCRIPTION OF THE DRAWINGS

Further features and advantages of the present invention will become apparent from the following detailed description, taken in combination with the appended drawings, in which:

FIG. 2 is a cross-sectional view of a fuel cell system in accordance with an embodiment of the present invention;

It will be noted that throughout the appended drawings, like features are identified by like reference numerals.

DETAILED DESCRIPTION OF THE PREFERRED EMBODIMENT

The invention can provide at first a functional integration of the multiple components of a fuel cell power system including a fuel cell stack, humidifier, a heat exchanger for cogeneration and a backup air-cooled cooling loop heat exchanger, a coolant storage tank, a coolant circulation pump, an air compressor or blower for cathode air supply and an air blower for air cooled heat exchanger as well as other accessories involved. These components are further mechanically integrated in a manner, unlike the conventional systems in the art, which substantially has no piping and fittings. The present invention can therefore provide a fuel cell power system that substantially reduces the weight, volume, complexity and cost.

Figure 1:
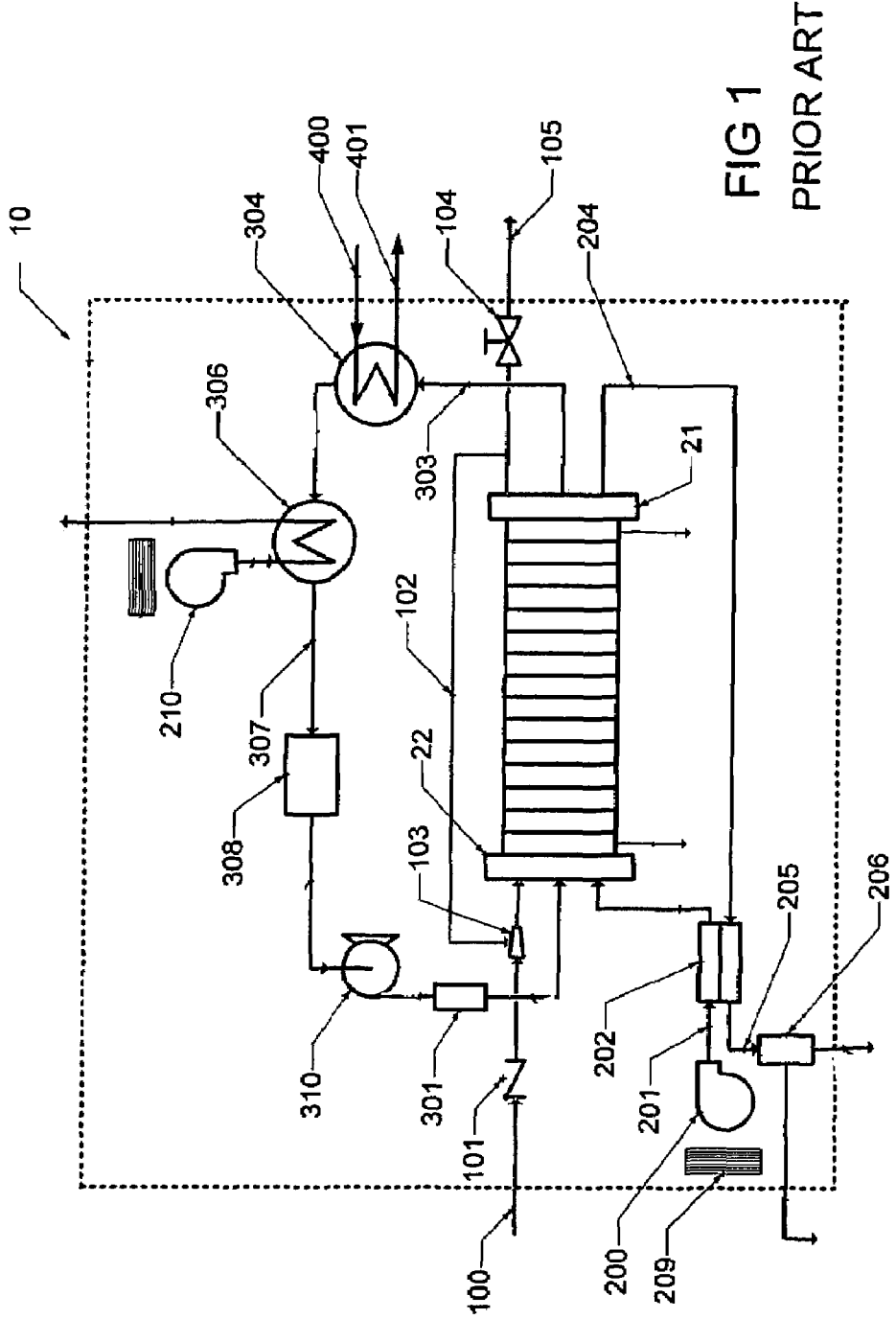
FIG. 1 is a schematic view of a fuel cell system in accordance with the prior art.

As was discussed in some detail previously, a functionally integrated fuel cell power system is schematically illustrated in FIG. 1 and is generally designated by reference number 10. The fuel cell power system 10 includes at least a fuel cell stack assembly, a fuel supply and exhausting stream, an oxidant (air) supply and exhausting stream, a fuel cell stack cooling loop, and a means allowing cogeneration. This system, as an integrated package, will have only inlets and outlets for these streams, and can be operated standalone (by supplying pure hydrogen, for instance) or connected to a fuel processor in which a hydrogen rich reformate stream is connected to fuel inlet 100.

Figure 3A:
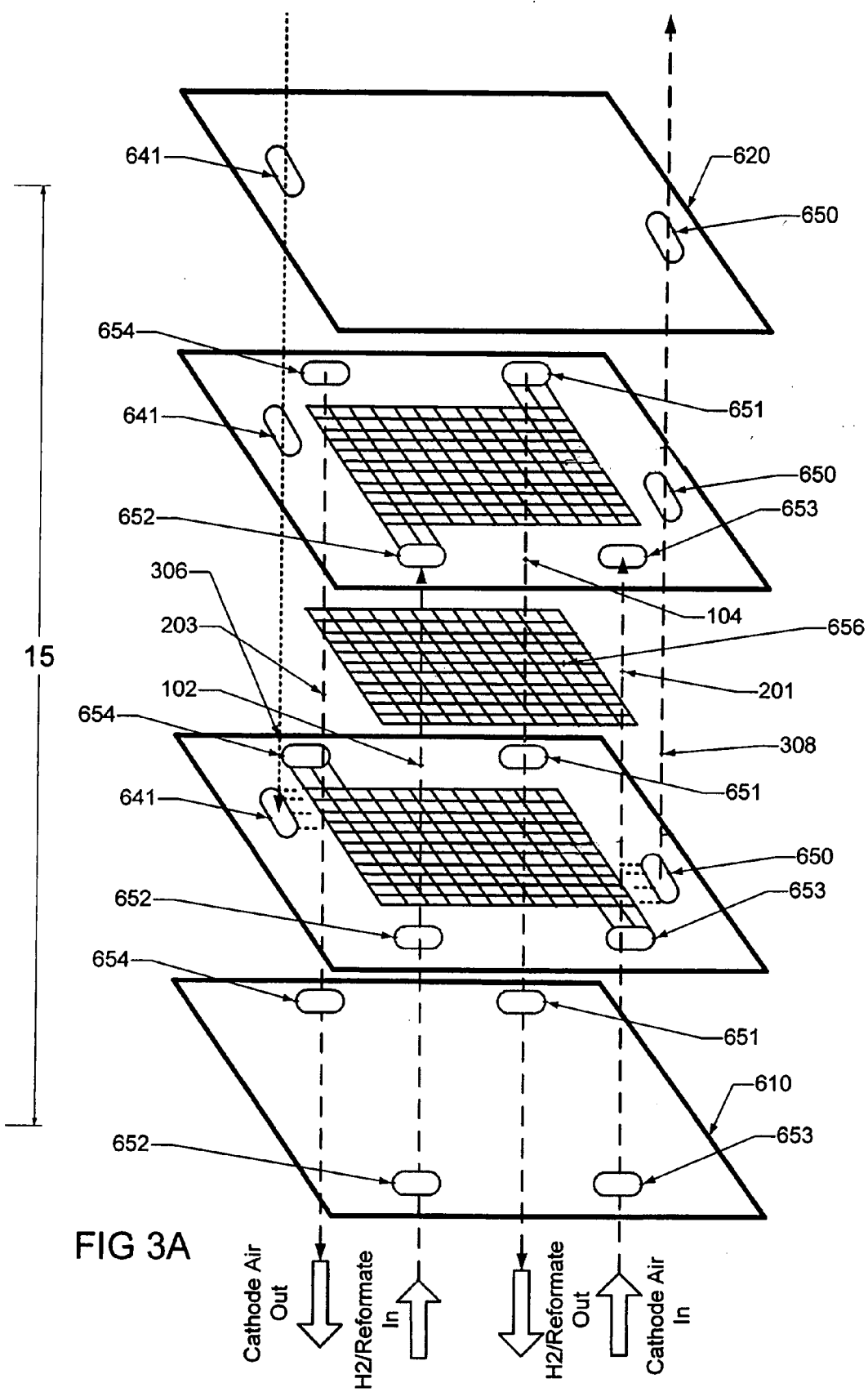
FIGS. 3A, 3B and 3C form an exploded view of the system of FIG. 2.
Figure 3B:
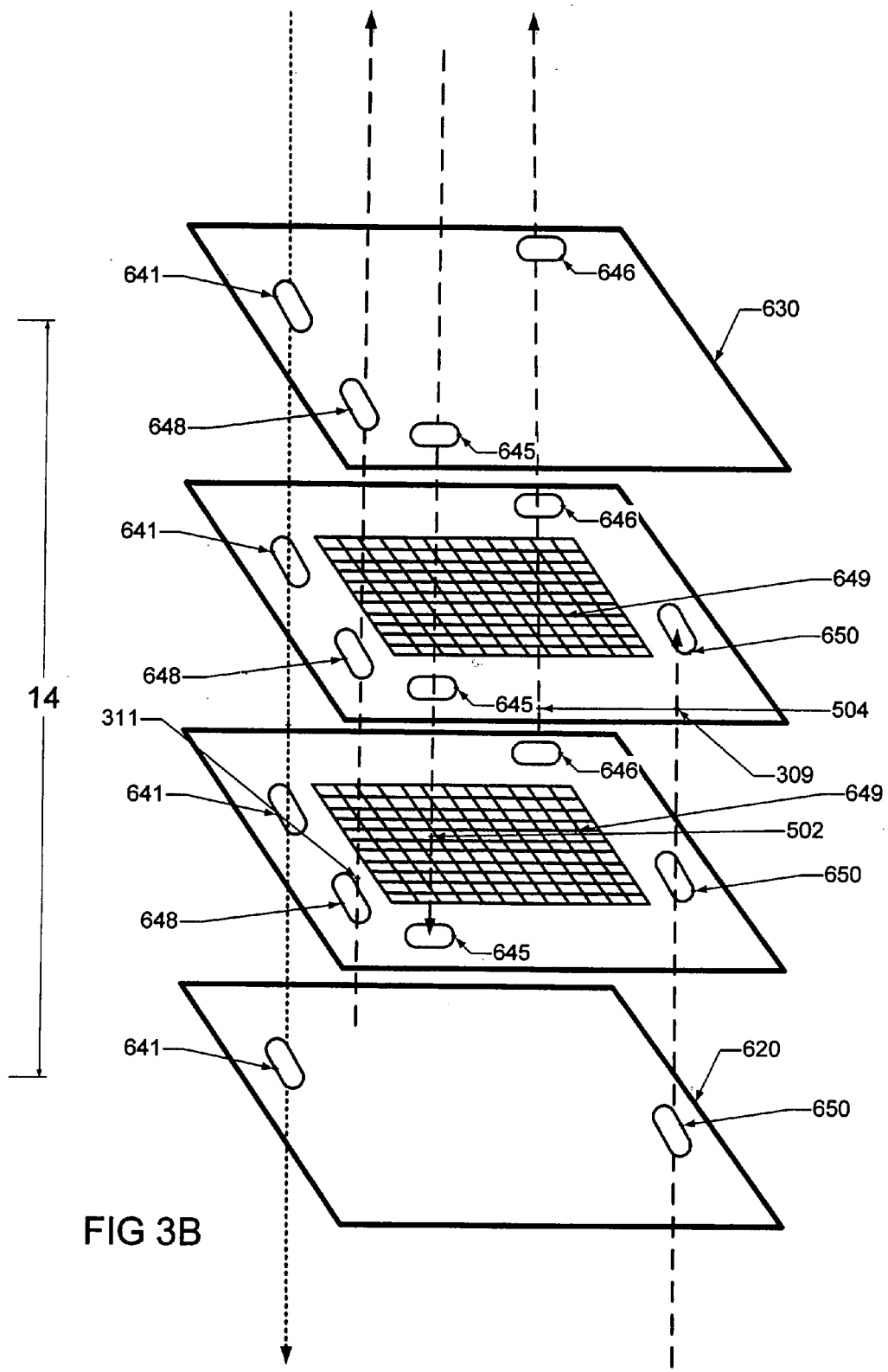
Figure 3C:
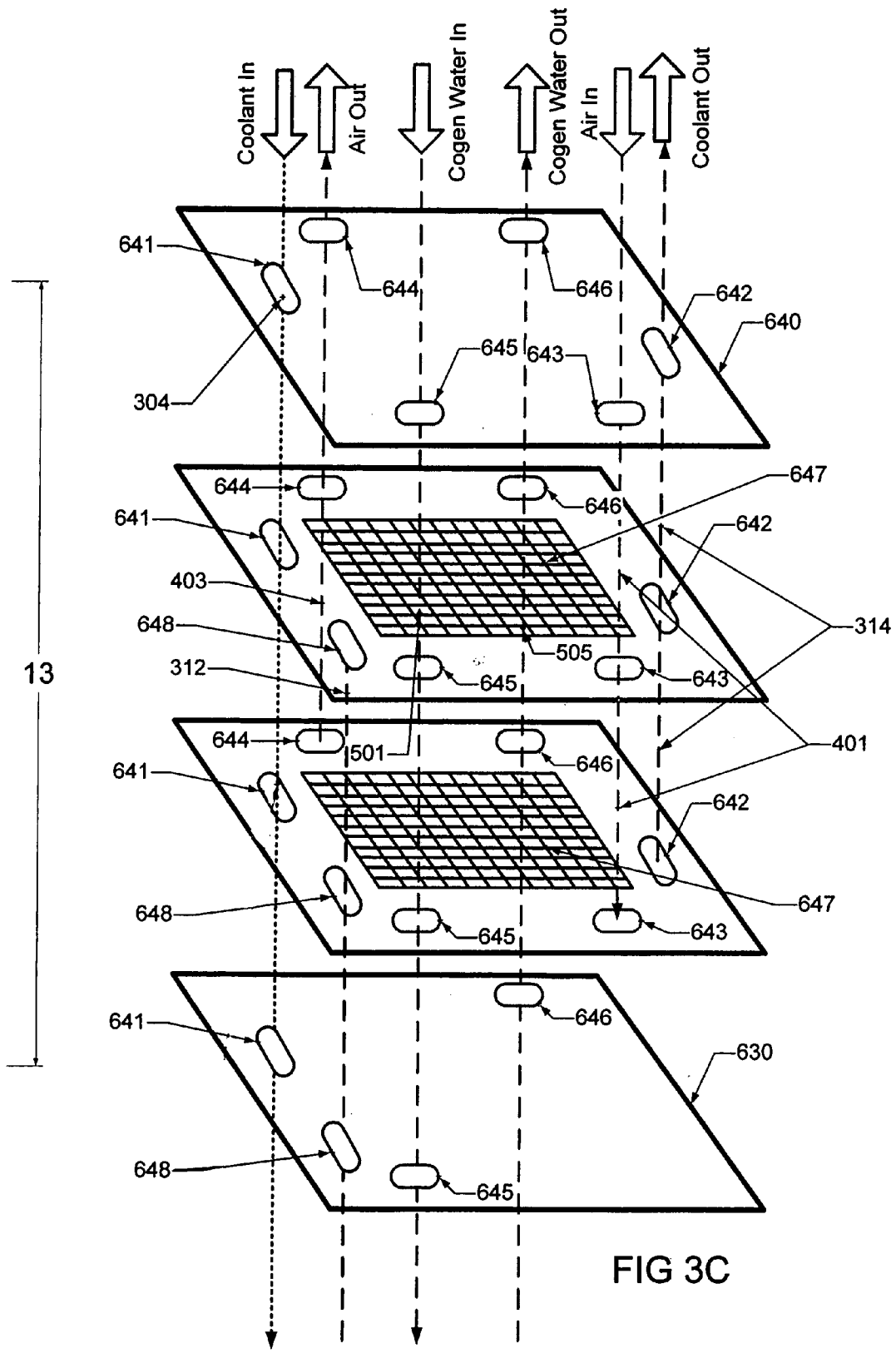

One embodiment according to the present invention to functionally and mechanically integrate the fuel cell system 10 of FIG. 1 is illustrated in great detail in FIG. 2. As will be further described hereinafter, all components of the fuel cell power system of FIG. 1 are integrated to form a compact package 10, which is advantageous over the conventional fuel cell systems in which individual components are connected and housed in a housing chamber. Referring to FIG. 2, there is a fuel inlet 100 that connects to a hydrogen source either as pure hydrogen or hydrogen rich reformate from a fuel processor. The integrated package 10 consists of several sections connected in a manner that substantially eliminates use of connecting pipes and fittings. Furthermore, such a structure would make it easy and simple for insulation to achieve maximum possible heat recovery and preventing the system from freezing under extreme cold weather conditions. FIG. 3 further details the structure of fuel cell power system of FIG. 2, showing particularly how the fluid flow can be arranged according to the present invention.

Still referring to FIG. 2, the integrated fuel cell power system 10 includes a coolant storage tank section 11, a housing section 12, an air-cooled heat exchanger section 13, a cogeneration heat exchanger section 14, an integrated fuel cell stack and internal humidifier section 15, and a second housing section 16. The coolant tank 300 can sit at one end or top on which an opening 301 is provided for coolant refilling. Although not shown, there may be a level sensor such as level switch installed on the coolant storage tank 300 to monitor and control the coolant level. On the side facing the section 12 there are openings on the coolant tank providing for connection of coolant flow to a filter 302, a coolant circulation pump 303 and flow from the coolant circulation loop 315. The section 12 is also housing the air blower 400 for supplying air to the air cooled heat exchanger 13, and pipelines for entering cogeneration water 500, cogeneration water return 505 and air exhaust 404. The multiple louvers 660 may be constructed on the section 12 to provide openings for air intake. Immediately adjacent to the section 12 is the backup air-cooled heat exchanger section 13, which is preferably made of heat exchanging plates preferably having corrugated structures. As described previously, the heat exchanger 13 works only when there is not enough cogeneration. To connect the fluids from the housing 12 the end plate 640 of the heat exchanger 13 provides openings for coolant inlet 641 and outlet 642, air inlet 643 and outlet 644, and cogeneration water inlet 645 and outlet 646. It should be understood that the position of these openings shown in FIG. 3 are only for illustrative purposes and they can be arranged in any fashion according to the flow arrangement in a practical design in accordance with the present invention. On the heat transfer plates, there is provided a heat exchange flow field 647, and the heated coolant and air flow alternatively and adjacently on one side of the plates. On the plate there is an opening inlet hole of any desired shape 643 to connect and distribute the air flow to the heat exchanging surface, an outlet hole of any desired shape 644 to connect and receive the air flow from the heat exchanging surface, and the inlet holes 643 and outlet holes 644, when the plates are stacked together, form the air inlet manifold 401 and air outlet manifold 403. Similarly, there is an opening inlet hole of any desired shape 648 to connect and distribute the coolant flow to the heat exchanging surface, an outlet hole of any desired shape 642 to connect and receive the coolant flow from heat exchanging surface, and the inlet holes 648 and outlet holes 642, when the plates are stacked together, form the coolant inlet manifold 312 and coolant outlet manifold 314. Furthermore, there is an opening hole of any desired shape 641 that is not connected to the heat-exchanging surface and is used only as a coolant transportation duct 304 in this section 13. There are two other holes of any desired shape 645 and 646 that serve only as fluid transportation ducts 501 for cogeneration water from and to a heat recovery system (HRS, not shown). The heat exchange between air 402 and coolant 313 can be arranged in any preferred patterns such as co-current and counter-current.

The section 14 defines the cogeneration heat exchanger, which again is preferably plate-type and immediately attached to the air-cooled heat exchanger 12. There is a separate plate 630 between, on which a hole 641 is provided for coolant passage, a hole 645 and a hole 646 for passing the cogeneration water, and a hole 648 for coolant flow communicating between the two heat exchangers. On the plate of the heat exchanger 14, a coolant inlet manifold 309 is formed by the holes 650, which connect and distribute the hot coolant to the heat exchanging surface 649 (fluid 504 in FIG. 2), correspondingly a coolant outlet manifold 311 is formed by the outlet holes 648 that receive the coolant from the heat exchanging surface 649. On the other side of the plate is the flow field for cogeneration water flow, which communicates with inlet holes 645, and outlet holes 646. The inlet holes 645 and outlet holes 646 form respectively the cogeneration water inlet and outlet manifolds 502 and 504. The holes 641 form a fluid-communicating duct only in the section 14.

Immediately adjacent to the cogeneration heat exchanger of the section 14 is the fuel cell stack assembly, separated by an endplate 620 on which two holes 641 and 650 provides passages for incoming and outgoing coolant flows. The fuel cell assembly 15 may refer to both a single cell and a multiple cell assembly to provide the necessary stack voltage as is well known in the art. A separate coolant plate, or maybe just on the rear side of the cathode plate, may also be provided to define the coolant flow paths for the heat removal and temperature control. All the cells are made substantially similarly with an anode plate on which appropriate flow channels define an anode flow field, a cathode plate on which appropriate flow channels define a cathode flow field, a membrane-electrode-assembly (MEA), a gas diffusion layer (GDL), and a means of sealing such as a gasket. The latter three may also come as an integrated assembly such as 3M's seven- and nine-layer MEA, which, for illustrative purpose only, is designated as 656 in FIG. 3. In operation, hydrogen or hydrogen rich reformate 100 is supplied to the stack entrance through a hole 652 on the endplate 610. There may be an injector 101 installed in the hydrogen supply line, which is used to help recycle the depleted hydrogen fuel from the stack outlet. On the endplate 610 there is another hole 651 to provide the fuel exhausting connection, and a hole 653 and a hole 654 to define the oxidant (usually air) inlet and outlet. When assembled, the holes 652 define the fuel supply manifold 102, while the holes 651 define the fuel outlet manifold 104. Similarly, the holes 653 define the oxidant supply manifold 201, while the holes 654 define the oxidant outlet manifold 203. On each cell there are also holes 641 and 650, which respectively define the coolant inlet and outlet manifolds 306 and 308 when the cells are assembled. The fuel flow 103 and the oxidant flow 202 as well as coolant flow 307 can be arranged in any desired fashion to provide the best performance.

The fuel cell stack employed in this embodiment of the present invention underlies another innovative feature that is disclosed in another application. The fuel cell stack herein represents an integrated fuel cell stack with an internal humidification mechanism, in which humidification of cathode incoming air is carried out by exchanging heat and moisture with the saturated or over-saturated cathode exhaust air on the same fuel cell plates. For details, the readers are encouraged to refer the related application titled "Fuel Cell with In-Cell Humidification", bearing agent docket number 16961-3US.

The disclosed compact design of the fuel cell power system may also include a fuel hydrogen recycling line with a control valve 105, an oxidant compressor or blower 200, a condensate collector or drain valve 204, a fuel hydrogen exhaust line with a control valve 106 and other necessary accessories. All these components can be housed in the section 16, on which multiple louvers 650 can be provided for air intake and ventilation.

It is noted that the coolant circulation loop, according to the present invention, has been integrated into the design of the heat exchanger and fuel cell plates. This feature of the present invention provides a cooling loop, unlike the others in the art, substantially without external and extra pipelines and fittings. It allows not only removal of pipes and fittings, but also simplifies the system, reduces the space occupancy, increases the compactness, and importantly eliminates the hardness of insulation of pipes and fittings that may have different sizes and shapes. This feature can also reduce the heat loss, and thus increases the thermal heat recovery efficiency because of the reduced heat emission surfaces by removing pipes and fittings. The feature results in a very compact design, and makes it possible to house multiple components of the fuel cell power system in a single insulated housing chamber.

Figure 4:
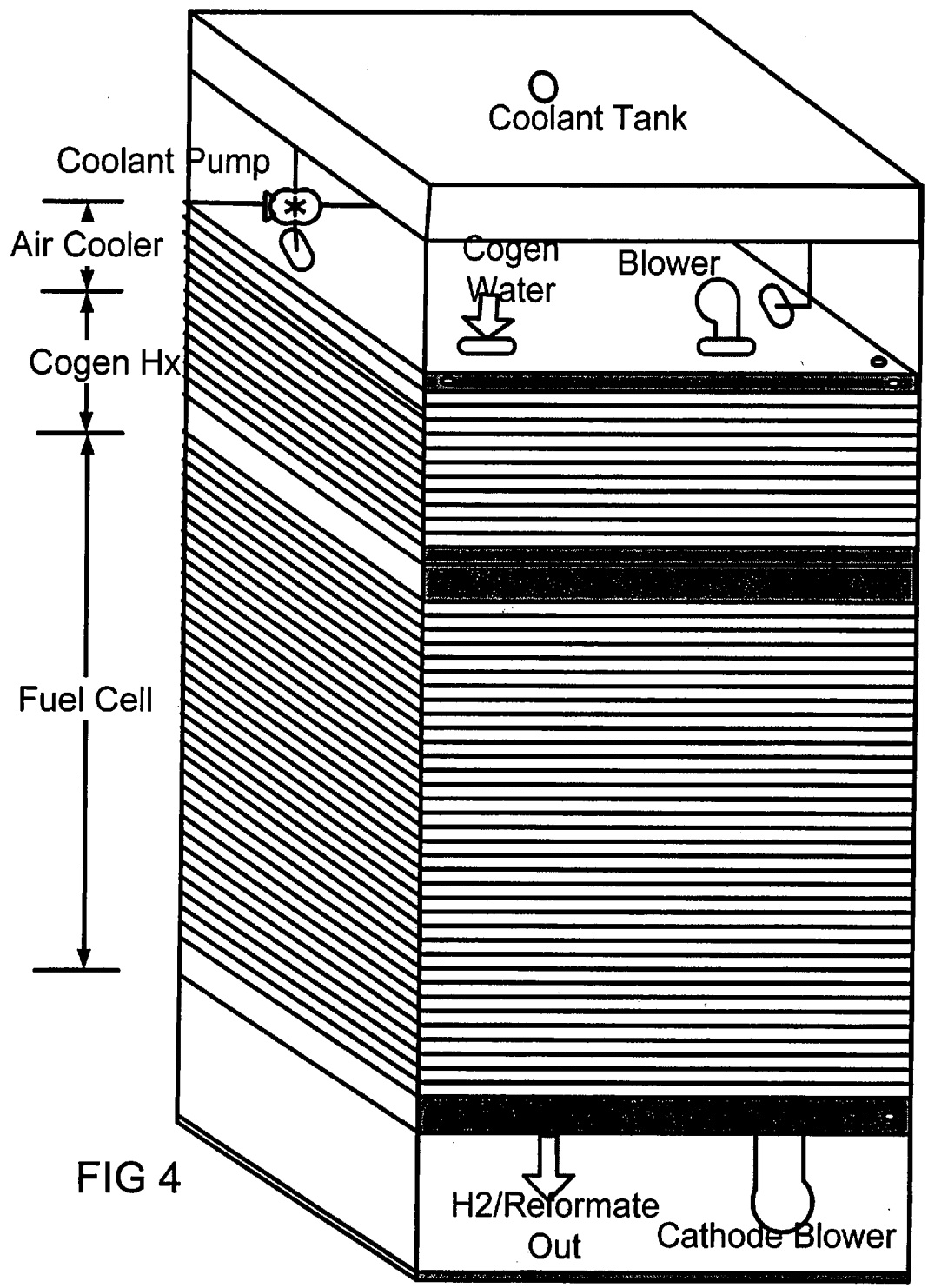
FIG. 4 is a perspective view of the fuel cell system of FIGS. 2 and 3.

FIG. 4 provides a perspective view of an assembled fuel cell power system according to the present invention as described previously in relation to FIG. 2 and FIG. 3. This assembly will be housed in a non-illustrated chamber, which has insulation materials embodied on its internal surfaces. No insulation on the individual components is required. The chamber has multiple louvers in the positions corresponding to the sections 12 and 16 to provide air intake and ventilation, and openings to provide access for electrical wires, fuel supply and exhaust as well as condensate drainage. There may also be a slot area corresponding to the position of the fuel cell stack to provide access for cell voltage measurement. The chamber is easily installable and removable.

Figure 5:
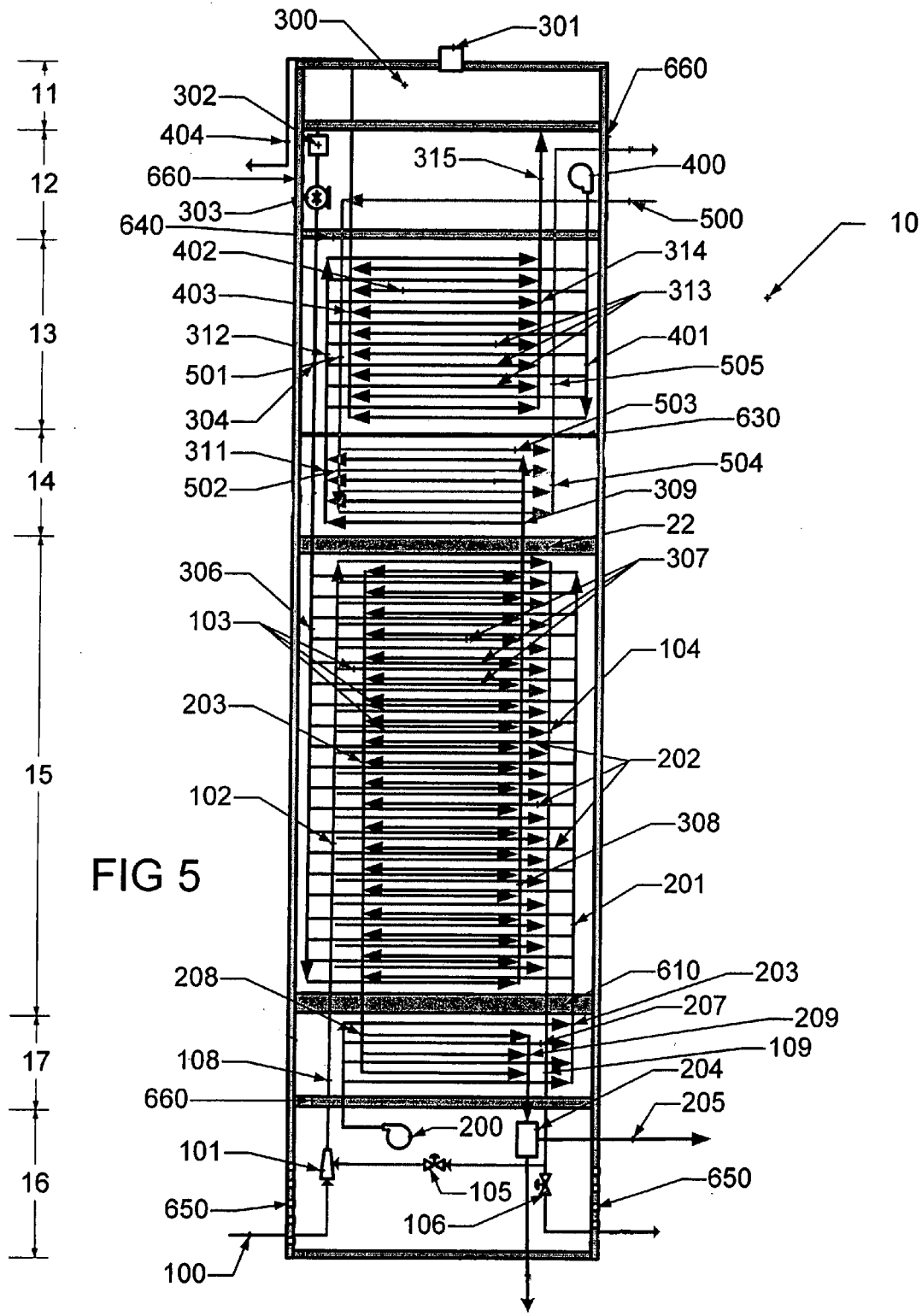
FIG. 5 is a cross-sectional view of a fuel cell system with a humidification system in accordance with a second embodiment of the present invention.
Figure 6A:
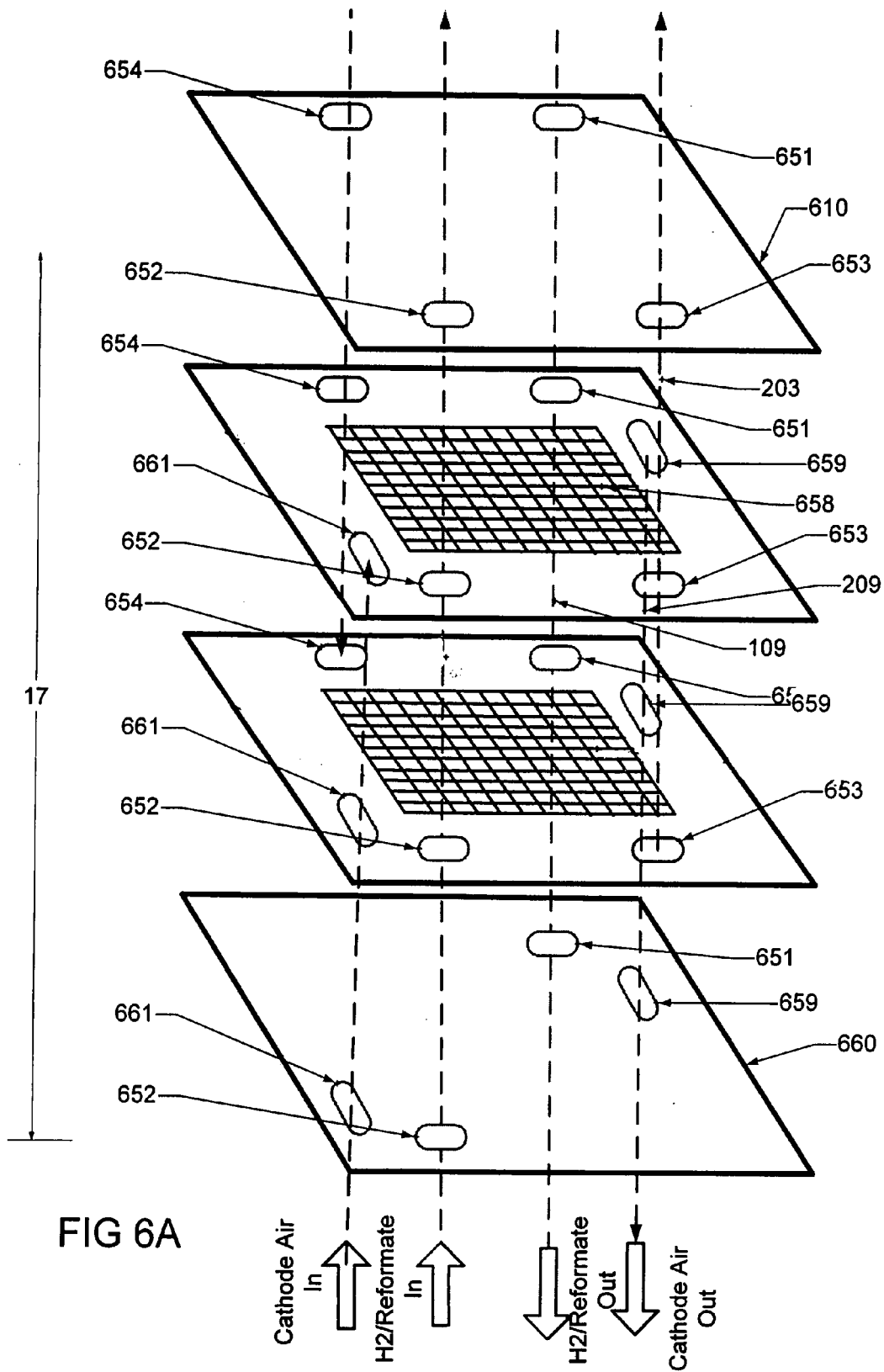
FIGS. 6A to 6D form an exploded view of the system of FIG. 5.
Figure 6B:
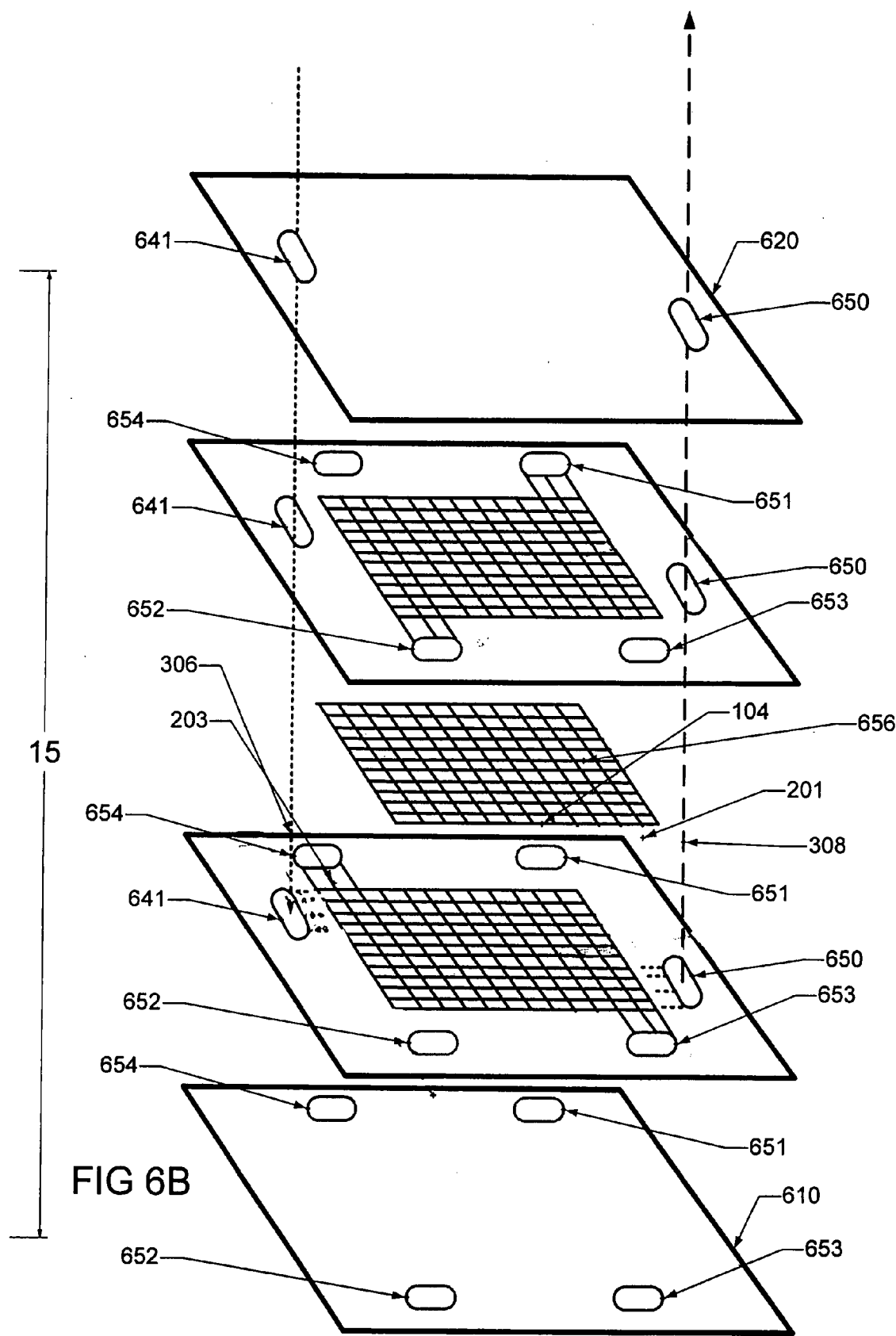
Figure 6C:
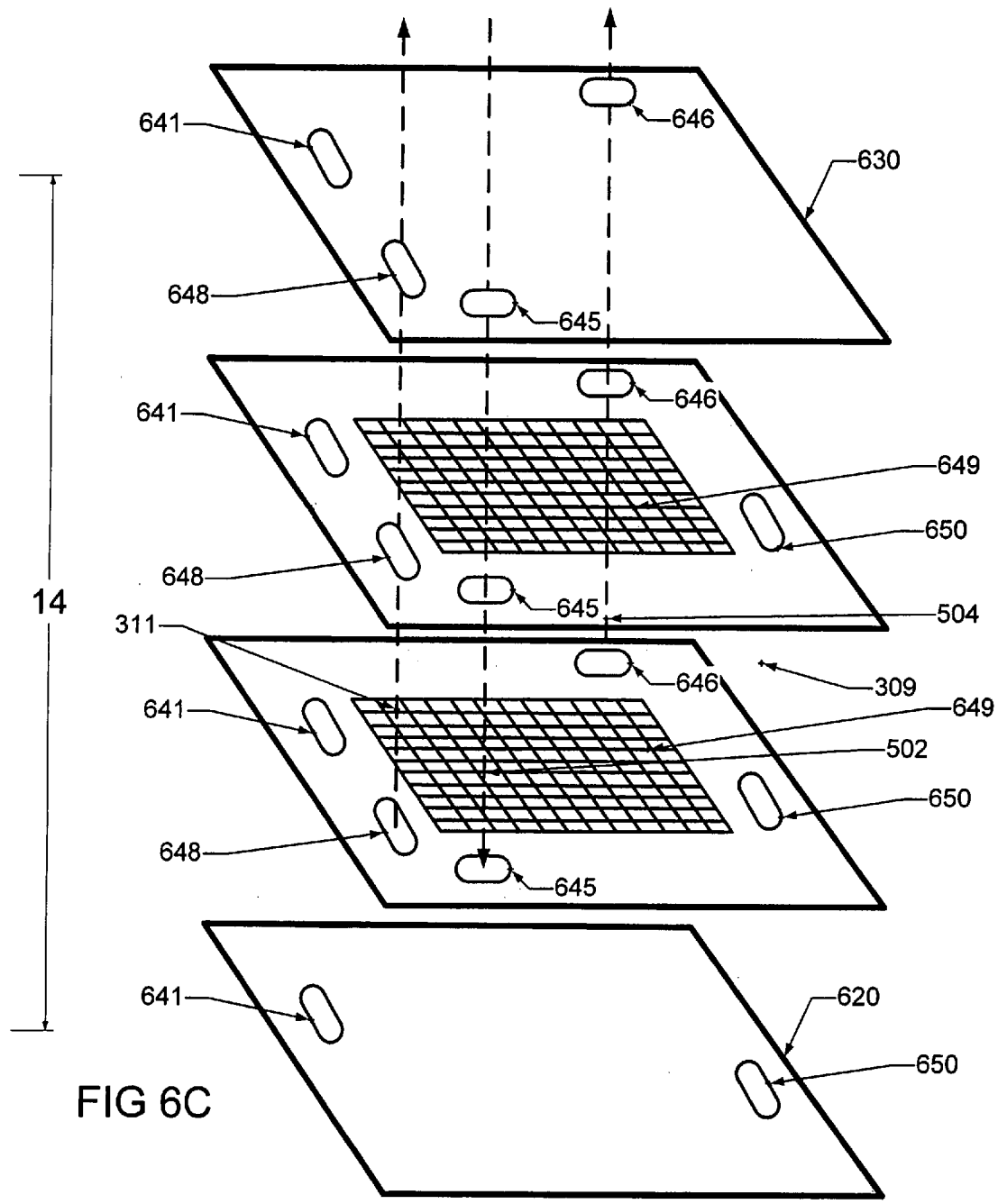
Figure 6D:
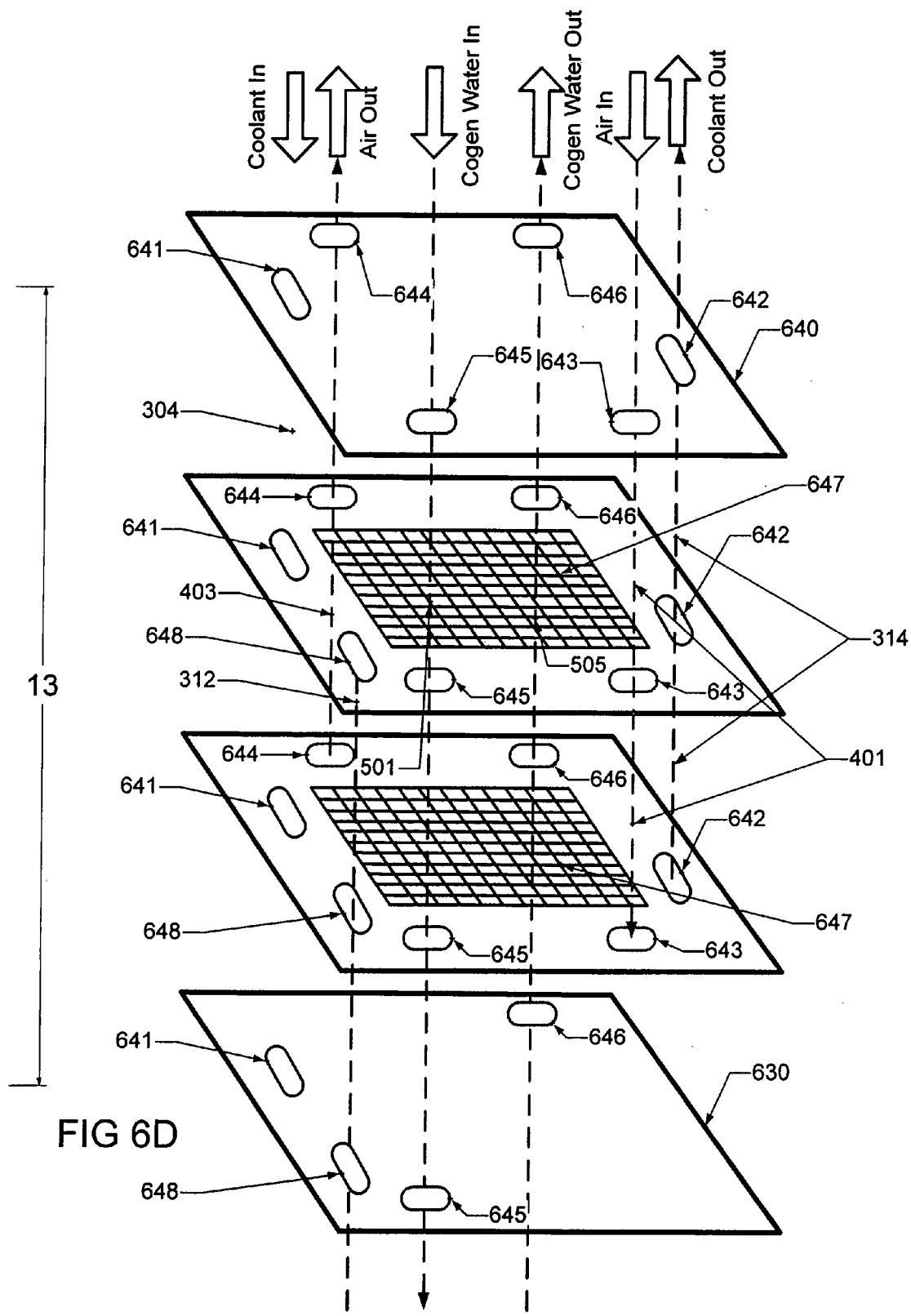

In some embodiments, the humidification may be carried out by an integrated fuel cell stack and humidifier assembly, in which the assembly consists of one section of fuel cells, and an adjacent section of plates of humidification that generally use water permeable hollow fiber membranes. Such fuel cell assembly has been disclosed previously in the art, such as in U.S. Pat. No. 5,382,478 on Jan. 17, 1995 issued to Clarence Y. Chow and Boguslav M. Wozniczka, and U.S. Pat. No. 6,602,625 on Aug. 5, 2003 issued to Xuesong Chen and David Frank. Corresponding to this type of humidification mechanism, a second embodiment according to the present invention is illustrated in FIG. 5 and FIG. 6. In FIG. 5 and FIG. 6 the sections 13, 14, 15 and 16 are essentially the same as those in FIG. 2 and FIG. 3. In FIG. 5 and FIG. 6 the fuel cell stack has a humidification section 17 located upstream from the electrochemical active section of the fuel cell stack 15. The inlet fuel (hydrogen or reformate) is introduced into the endplate 660 through a hole 652, and extends all the way through section 17 to the fuel cell active section through the manifold 108 formed by the holes 652. On the plates of the section 17 there are also fuel outlet holes 651 and the formed manifold 109. The oxidant (air) is directed into the inlet 661, which communicates with the flow field 658 over which the heat and moisture are transferred from the cathode exhaust stream flowing over the other side of the water permeable membrane (not shown) over the flow field 659 that connects to the manifold 208 formed by the holes 654. The humidified air exits the flow field and enters into the manifold 203 through the holes 653. The manifold 203 connects directly to the fuel cell active section 15. The sections 15 and 17 are separated by the separating plate 610. The cathode air, after giving the heat and moisture to the incoming cathode air, is directed though the holes 659 to the formed manifold 209, which is further introduced to a condensate collector or drain valve 204. The condensate 317 is released from 204 while the air is vented though line 205.

Further referring to FIG. 5 and FIG. 6, the accomplished assembly can be easily housed in a single, compact, and insulated chamber, in a similar manner as previously illustrated in FIG. 4. The features of the present embodiment are apparent, i.e. compact, simple, substantially no piping and fitting needed, easily insulated, cost-effective for manufacturing, and highly efficient.

Figure 7:
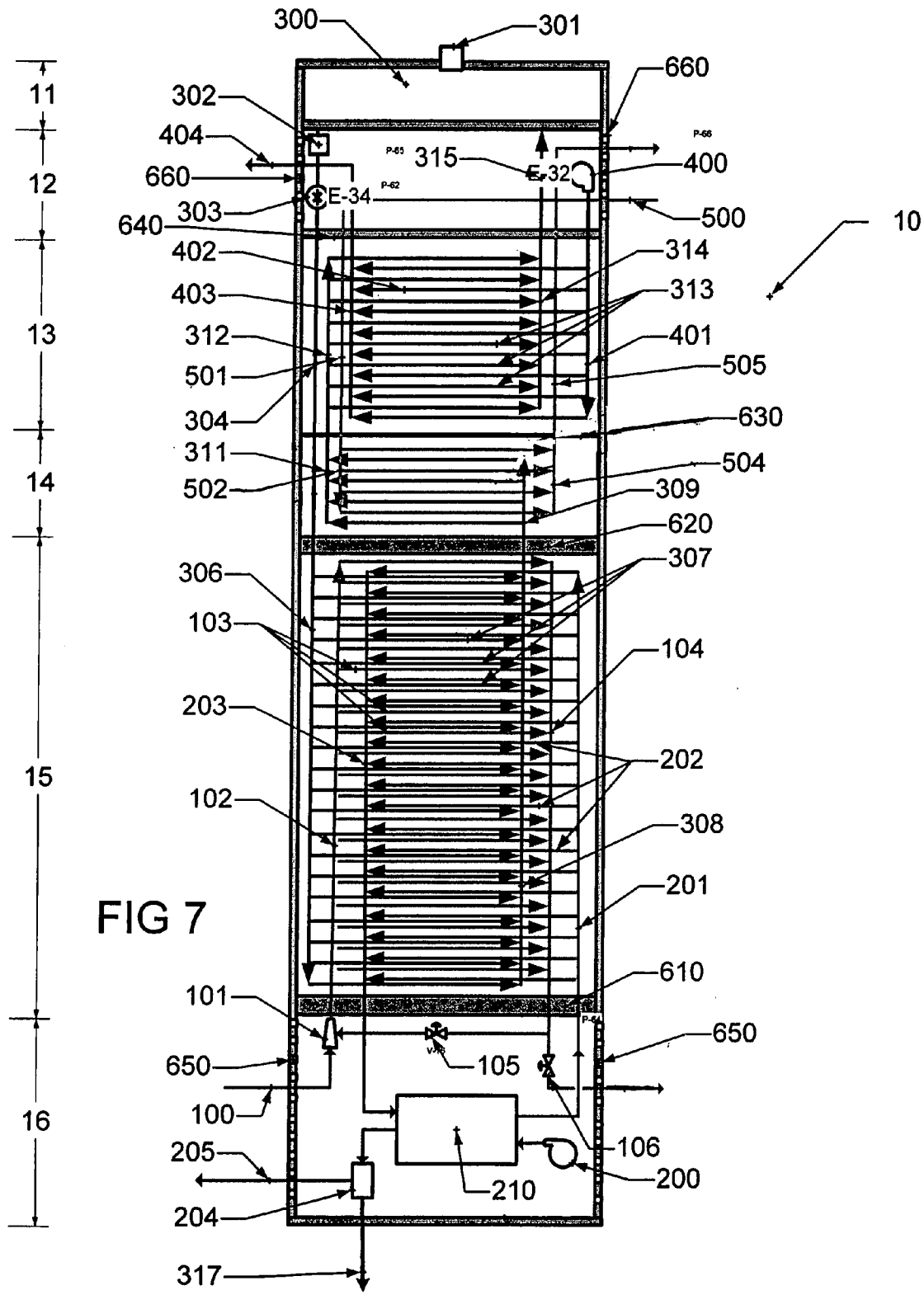
FIG. 7 is a cross-sectional view of a fuel cell system with an external humidifier in the second housing section in accordance with a third embodiment of the present invention.

A further embodiment of the present invention is schematically shown in FIG. 7. In this embodiment, the fuel cell humidification is carried out by a conventional fashion, i.e. an external humidifier being either an enthalpy wheel or a membrane device. The humidifier 210 is located in the space of the section 16, which receives incoming cathode air from the air compressor or blower 200, and cathode exhaust air from the connector of the manifold 203. The humidified air is sent to the fuel cell stack 15, and the exhaust air 205 is vented after passing the condensate drain valve 204. The remaining sections 11 to 15 in FIG. 7 are essentially the same as those previously described in FIG. 3 and FIG. 4.

Figure 8A:
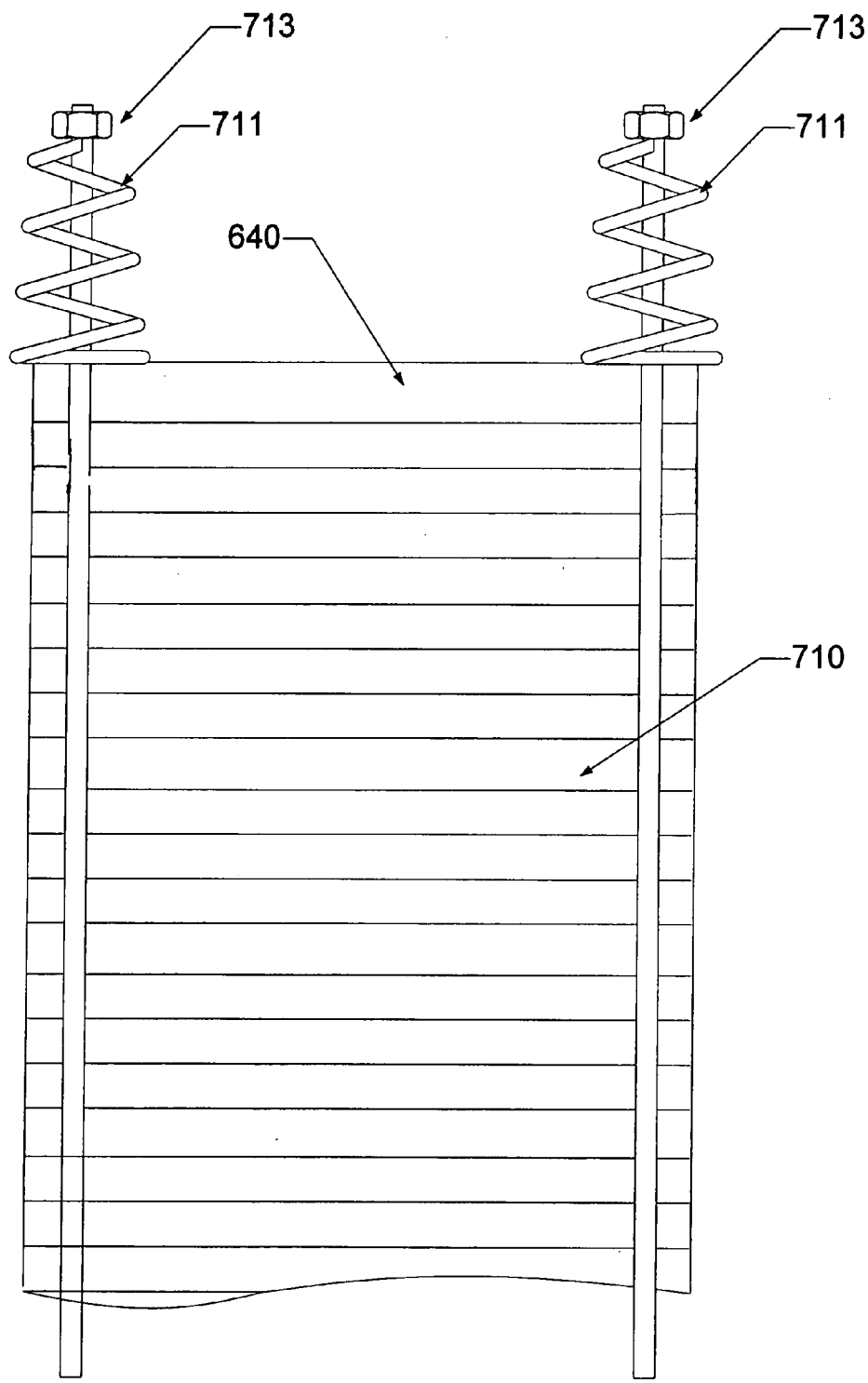
FIG. 8A is a schematic illustration of fuel cell stack clamping method in accordance with the prior art
Figure 8B:
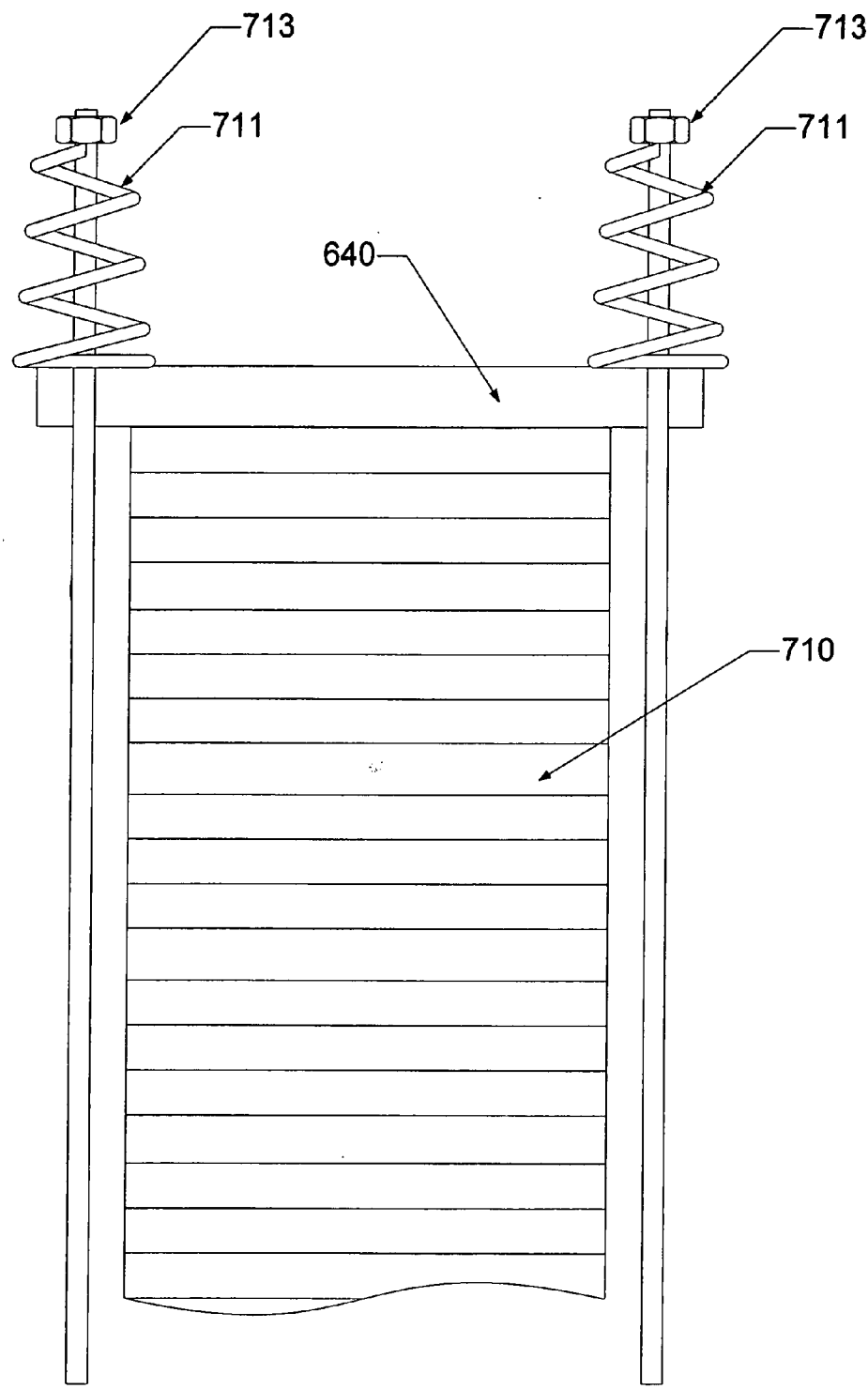
FIG. 8B is another schematic illustration of fuel cell stack clamping method in accordance with the prior art

Fuel cell stack having multiple cells is conventionally assembled by using tie rods, as schematically illustrated in FIG. 8A and FIG. 8B. In conventional designs, the fuel cell endplate 640 may have the same or different size as the cell plates 710. In the former case, the tie rods would penetrate through holes pre-designed on the plates (FIG. 8A), and in the latter case the tie rods will be outside of the plates (FIG. 8B). Immediately on the endplate, there is usually installed a spring 711, which is to provide a force adjustment during and after the cells are compressed and the bolts 713 are tied.

Figure 8C:
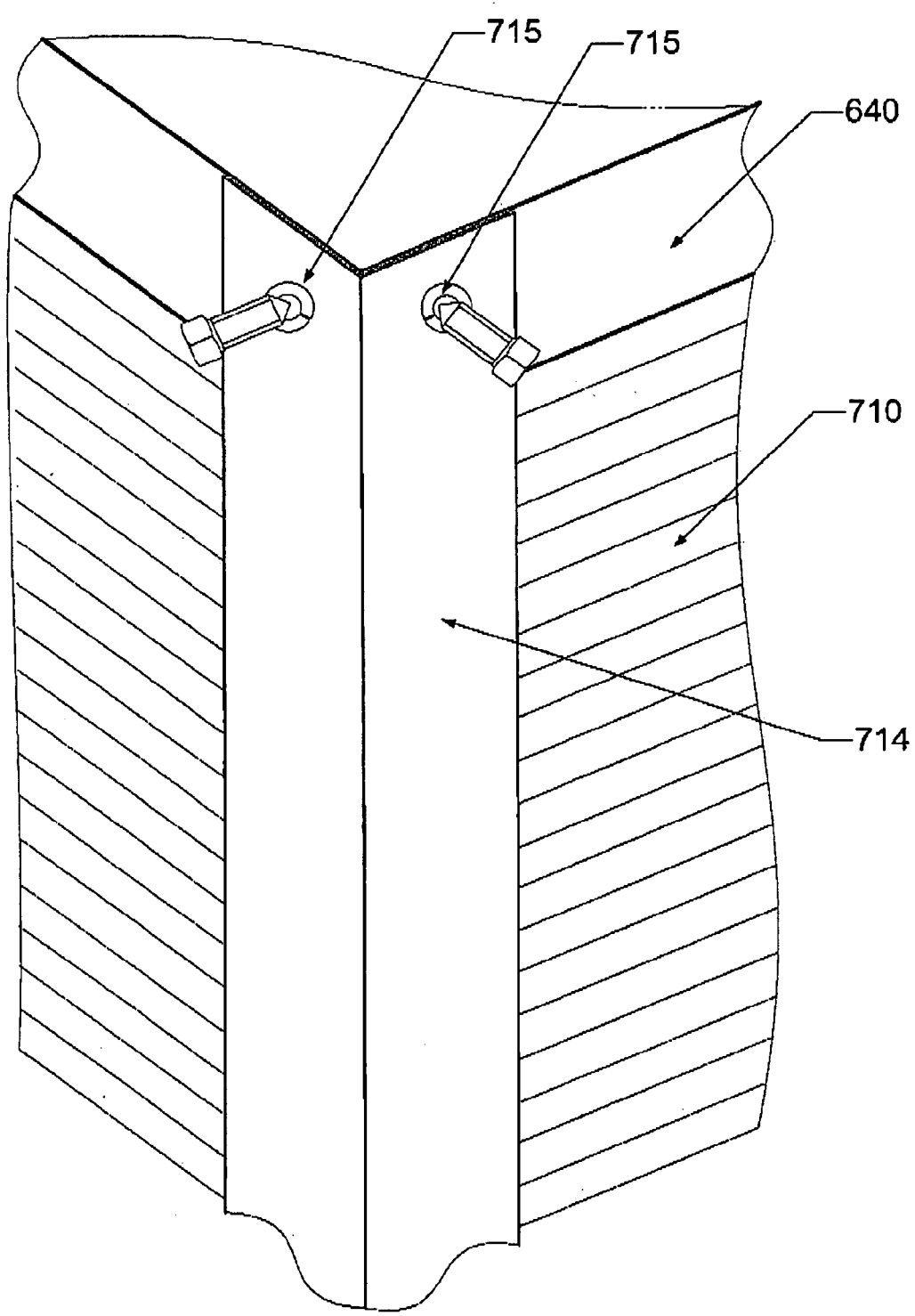
FIG. 8C is a schematic illustration of fuel cell stack and fuel cell power system claming method in accordance with the present invention.

While the conventional clamping methods shown in FIG. 8A and FIG. 8B can apply to the stack and fuel cell power module assembly including fuel cell stack, cogeneration heat exchanger, and air-cooled heat exchanger according to the present invention, there is also provided a preferable clamping method as schematically illustrated in FIG. 8C. In FIG. 8C, a part of fuel cell power module is illustrated, including an endplate 640 and a plurality of plates (fuel cell and/or heat exchangers) 710. According to the present invention, the endplate 640 has the same cross-sectional dimensions as the plates 710, but with a thicker thickness. At each angle of the assembly, there is provided an angled support 714, on which holes 715 are pre-designed at positions corresponding to the holes on endplate 640. After compression, allen type bolts are screwed in with appropriate tightness. It is clear that the fuel cell stack and/or fuel cell power module assembled according to this method will be able to prevent de-shaping, looseness during especially transportation and handling.

After the fuel cell power module is assembled according to the clamping method described above, then a layer of thermal insulation, preferably sheets of ceramic fiber or micro-porous ceramic insulation materials that have been cut into the dimensions matching the external surfaces of the assembly, would be installed around the assembly. Then, the insulated assembly will be housed into a housing chamber (not shown) on which inlet and outlet ports or connectors for fuel, air and coolant streams are provided. There are also connectors for stack current and cell voltages on the housing chamber.

While the invention has been described with reference to the preferred embodiment, it will be understood by those skilled in the art that various changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims. The present invention would be suitable for both stationary and transportation applications.

The invention claimed is:

1. A fuel cell power system including at least one fuel cell stack assembly having a clamp mechanism for holding plates of the fuel cell stack together, a fuel supply and exhausting stream, an oxidant supply and exhausting stream, at least one housing section and at least one of a fuel cell stack cooling loop and a cogeneration heat exchanger, characterized in that:

at least one of the cooling loop and the cogeneration heat exchanger comprises a stack of heat exchange plates held together with said plates of said fuel cell stack by said clamp mechanism, and the at least one housing section comprises accessorial components and is connected to said fuel cell power system by said clamp mechanism.

2. The system as claimed in claim 1, wherein said plates of the fuel cell stack comprise humidification zones for humidifying supply fluid streams of at least one of the fuel supply and the oxidant supply.

3. The system as claimed in claim 1, further comprising a humidification plate stack held together with said plates of said fuel cell stack and said stack of heat exchange plates by said clamp mechanism.

4. The system as claimed in claim 1, further comprising a coolant storage tank section mounted to one end of said stack assembly.

5. The system as claimed in claim 1, wherein all plates in said stack assembly have a same cross-section.

6. The system as claimed in claim 1, wherein both said cooling loop and said cogeneration heat exchanger comprise a stack of heat exchange plates held together with said plates of said fuel cell stack by said clamp mechanism.

7. The system as claimed in claim 1, wherein said stack assembly is pipe or hose free, all conduits being formed by a series of overlapping apertures in said plates of said stack assembly.

* * * * *